United States Patent [19]

Vaughan

[11] Patent Number: 5,018,308
[45] Date of Patent: May 28, 1991

[54] BELT WEATHERSTRIP FOR AUTOMOTIVE VEHICLE

[75] Inventor: Robert A. Vaughan, Dearborn, Mich.

[73] Assignee: The Standard Products Company, Cleveland, Ohio

[21] Appl. No.: 403,380

[22] Filed: Sep. 6, 1989

[51] Int. Cl.⁵ .............................................. E06B 7/16
[52] U.S. Cl. ........................................ 49/491; 49/374; 428/122
[58] Field of Search ................ 49/440, 441, 488, 490, 49/491, 497, 498; 428/122, 358

[56] References Cited

U.S. PATENT DOCUMENTS

| | | | |
|---|---|---|---|
| 4,030,245 | 6/1977 | Yeoman | 428/122 X |
| 4,105,814 | 8/1978 | Eggert | 428/122 |
| 4,311,747 | 1/1982 | Kruschwitz | 49/490 X |
| 4,800,681 | 1/1989 | Skillen et al. | 49/374 X |
| 4,869,945 | 9/1989 | Harney | 49/490 X |

FOREIGN PATENT DOCUMENTS

| | | | |
|---|---|---|---|
| 211624 | 8/1966 | Sweden | 49/490 |
| 2006309 | 5/1979 | United Kingdom | 49/490 |

Primary Examiner—Rodney M. Lindsey
Assistant Examiner—Jerry Redman
Attorney, Agent, or Firm—Harness, Dickey & Pierce

[57] ABSTRACT

A flange finisher strip has a reinforcement member and elastomeric cover. The reinforcement member is channel shaped in cross section with a member extending inwardly into the channel. A retaining mechanism is associated with the extending member to secure the strip onto a flange.

11 Claims, 2 Drawing Sheets

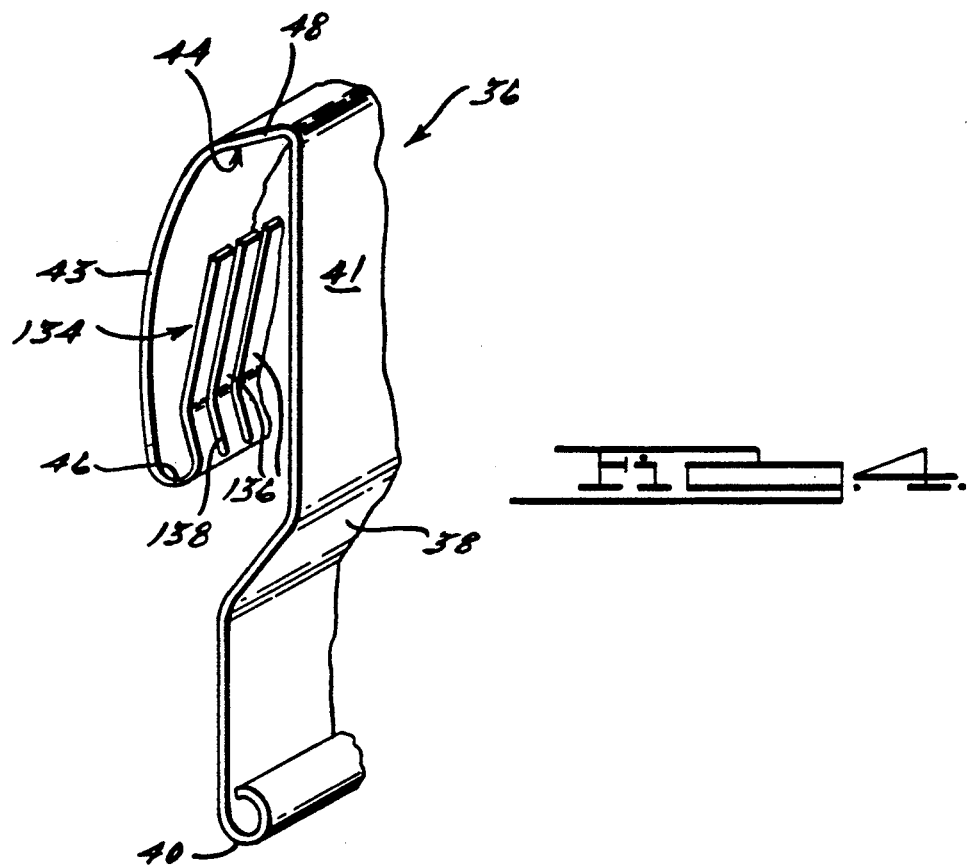
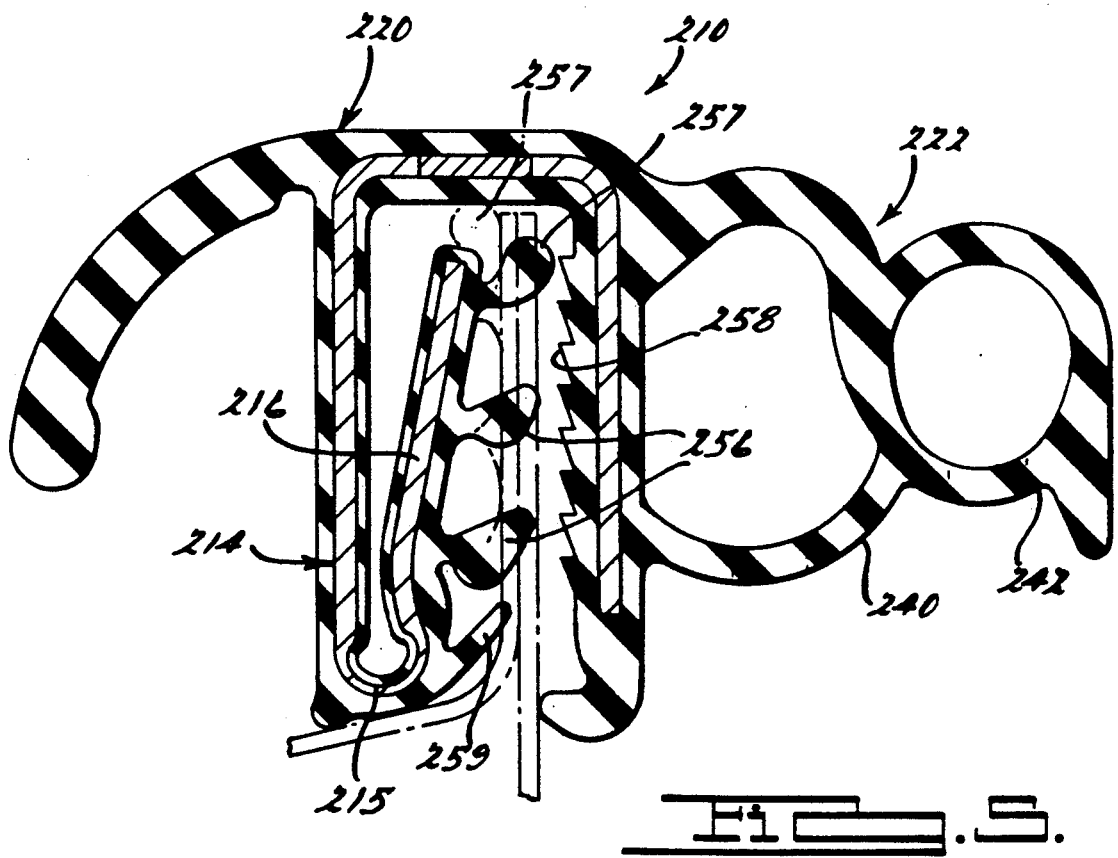

BELT WEATHERSTRIP FOR AUTOMOTIVE VEHICLE

BACKGROUND AND SUMMARY OF THE INVENTION

The present invention relates to flange finisher strips and, more particularly, to weatherstrips for automotive vehicles Flange finisher strips are used in the automotive industry to mount weatherstrips to seal the edges of windows, doors, trunks, engine compartments or the like. Flange finisher strips are also used to cover flange edges for decorative and/or protective purposes. Generally, flange finishers are installed onto a flange during the assembly of the automotive vehicle and, hence, it is desirable that the flange finisher strip be easily installed. On the other hand, it is also generally intended that the installation be permanent, hence, it is also desirable that the flange finisher be highly resistant to removal from the flange.

Belt weatherstripping as well as other weatherstripping is well known in the automotive art. Belt weatherstripping may be used along the flange at the bottom of a movable window of an automotive vehicle to cover the flange, to seal the window and to improve the appearance of the vehicle. In this case, belt weatherstripping may have a show surface which is presented to view from the outside of the vehicle.

Although weatherstrips are known in the art, there remains a need for improved retention means to secure the weatherstrip onto the associated flange. In particular, there is a need for weatherstrips to have an improved tolerance to irregularities on or in the flange. Thus, it would be desirable in the case of belt weatherstripping, if the weatherstrip would present a consistent smooth outer show surface even when mounted on an irregular flange. It would also be desirable if the show surface of the belt weatherstripping were accurately and consistently positioned regardless of irregularities in the associated flange. It, of course, also would be desirable if the weatherstrip were easily mounted or installed on the flange with relatively little force but, once mounted, would require substantial force to remove.

Accordingly, the present invention provides an improved flange finisher especially suitable for use as a belt weatherstrip on the automotive vehicle. The weatherstrip has an improved retention means which is easily installed on a flange but is then difficult to remove. Furthermore, the weatherstrip may present a consistent show surface and is tolerant to irregularities in the associated flange.

These and other advantages of the present invention will be apparent from the following description taken in conjunction with the accompanying drawings and claims.

BRIEF DESCRIPTION OF THE DRAWINGS

FIG. 4 is a perspective view of a portion of a reinforcement member of the weatherstrip in accordance with the present invention.

FIG. 5 a cross-sectional view of another embodiment of the present invention.

DETAILED DESCRIPTION OF THE PREFERRED EMBODIMENT

Figure 1:
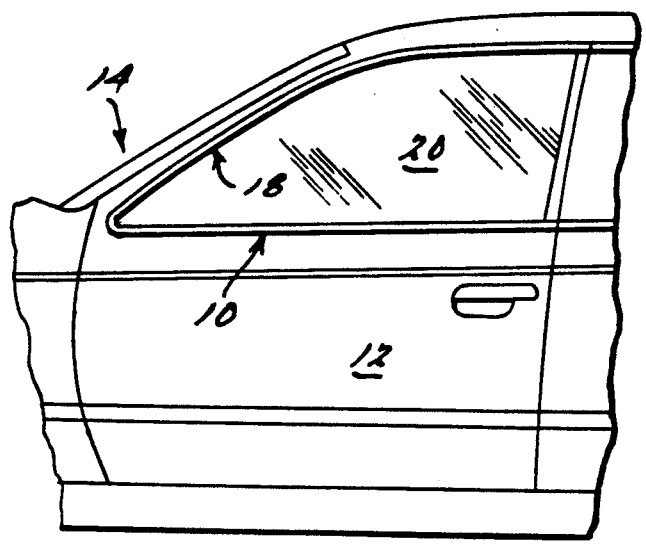
FIG. 1 is a side elevation, broken away, of an automotive vehicle with an embodiment of a belt weatherstrip of the present invention assembled thereon.
Figure 2:
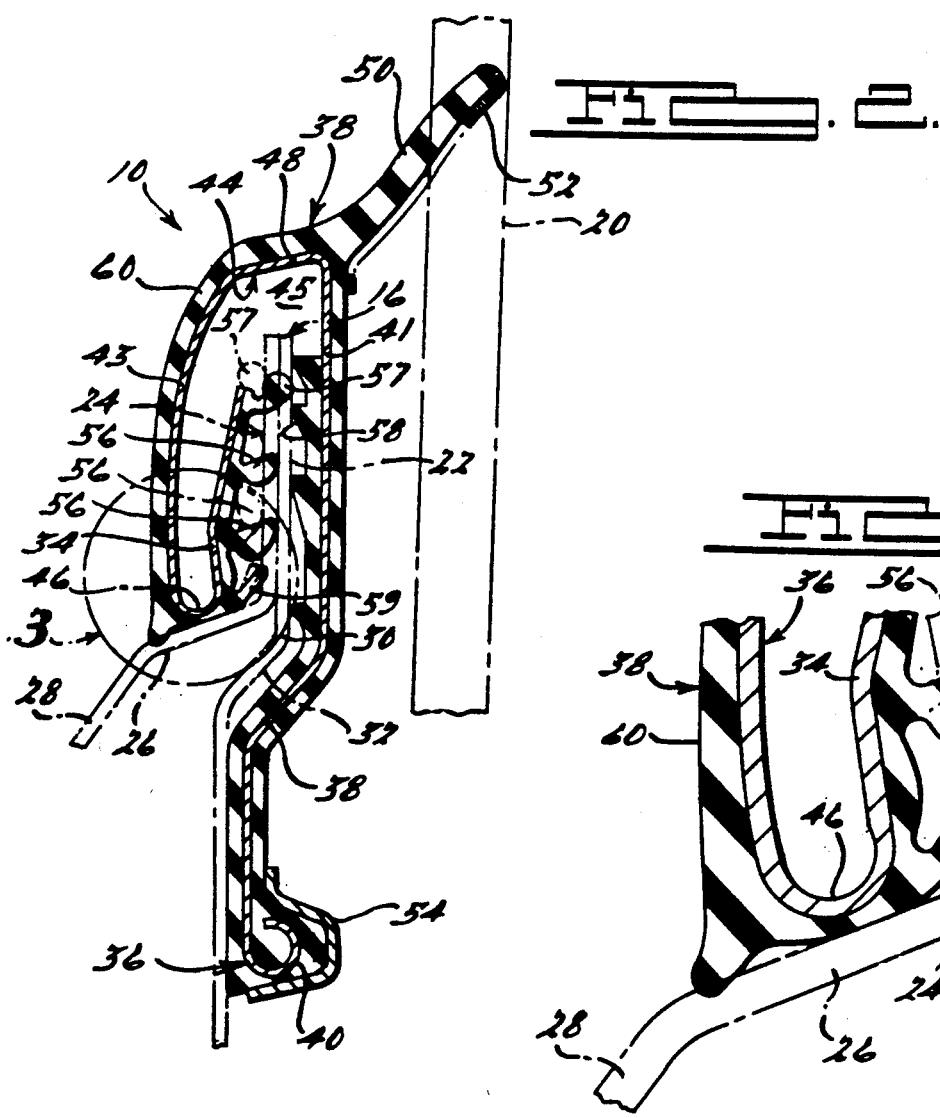
FIG. 2 is a cross-sectional view of an embodiment of a weatherstrip of the present invention with an associated flange and window pane shown in broken lines.
Figure 3:
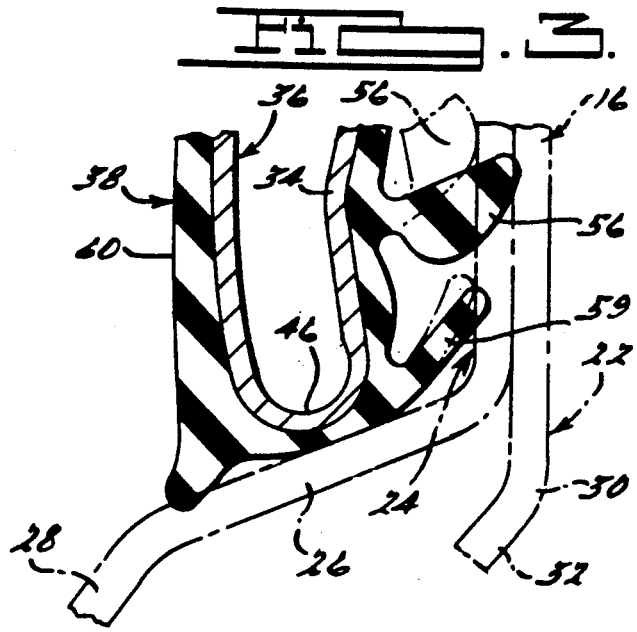
FIG. 3 is an enlarged view of the portion of FIG. 2 within the circle shown in broken lines on FIG. 2 and indicated by the numeral 3.

Now referring to the FIGS. 1-3, a preferred embodiment of a belt weatherstrip of the present invention is shown and indicated generally by the numeral 10. Belt weatherstrip 10 is shown in FIG. 1 installed on door 12 of automotive vehicle 14 along a door flange 16 which extends horizontally along the lower edge of a window opening 18 having a glass window pane 20 which is movable from a raised, closed position as shown in FIG. 1 to a lowered, open position in a conventional manner.

Belt weatherstrips 10 is securely mounted on door flange 16 which has an inner metal shut 22 and an outer metal shut 24 joined and welded together as is conventional in the art. Outer metal shut 24 is formed to extend outwardly as shown in FIG. 2 to provide shelf 26 with outer face 28 extending downwardly therefrom. Inner metal shut 22 also is formed to extend outwardly at 30 to provide shoulder 32 for increased clearance of glass pane 20 and mechanical retention of belt weatherstrip onto flange 16.

Belt weatherstrips 10 is shown in detail in FIGS. 2 and 3. Belt weathership 10 is an elongated member and is hook shaped with a reentrant mounting leg portion 34 in cross section. The belt weatherstrip 10 has a substantial rigid metal core or reinforcement member 36 which carries and supports an elastomeric cover 38 surrounding a substantial portion of the core or member 36.

The core or member 36 may be formed by passing a metal strip through forming rolls to provide it with its hook shape with reentrant mounting leg 34 in cross-section as shown in FIG. 2. Core or member 36 has a shoulder portion 38 which cooperates with shoulder 32 of the inner door metal shut 22 to ensure retention of belt weatherstrip 10 on flange 16. Core or member 36 has a circular eyelet tail portion 40, in cross section, to impart increased strength at the tail portion 40 of belt weatherstrip 10. The core or member 36 includes a fish hook shaped portion 44, in cross section, with legs 41 and 43, a radius or web portion 48, a radius or web portion 46 and bent mounting leg 34 extending therefrom. The interior of the fish hook portion 44 defines a channel 45 within which reentrant bent mounting leg 34 extends therein to aid in securing to the flange 16.

The radius portion 46 is formed between the fish hook portion 44 and mounting leg 34 off of leg 41. The radius portion 46 has a reduced thickness and reduced strength as compared to hook radius portion 48. Thus, radius portion 46 will bend or yield before hook radius portion or web 48 between legs 41 and 43. The hook portion 44 with radius portion 48 and the radius portion 46 with mounting leg 34 act as a dual or two stage spring. The first spring portion, hook portion leg 43 with radius portion 48, requires a larger force than the second spring portion, radius portion 46 and mounting leg 34, to deflect, thus, the second spring portion, radius portion 46 and mounting leg 34, deflects before the first spring portion, hook portion leg 43 with radius 48.

Support core or reinforcement member 36 is largely covered by elastomeric cover 38 which may be comprised of any suitable plastic or rubber material such as EPDM, thermoplastic, thermosetting, PVC, TPE or other rubber-like or rubber material extruded onto core 36 as is conventional in the art. Elastomeric cover 38 has a glass sealing rib 50 with flocking 52 thereon to reduce friction when the glass pane 20 is raised or lowered. Also, flocking 54 is provided on tail portion 40 to reduce friction when the glass pane 20 comes in contact therewith.

Elastomeric cover 38 include a retention mechanism comprised of rolling lock members 56 and ribs 58. The rolling lock members 56 are positioned on the mounting leg 34 and are opposed by ribs 58 positioned on leg portion 41 of hook portion 44. The rolling lock members 56 and ribs 58 enable easy insertion of the weatherstrip on to the flange 16 but strongly resist the weatherstrips removal. The resistance is enhanced by the rolling lock member 57 abutting the free end 35 of the mounting leg 34 when the weatherstrip is secured onto the flange 16 as is shown in phantom in FIG. 2.

The ribs 58 opposing the rolling lock members 56 and 57 are positioned to oppose a space between the rolling lock members 56 and 57 as seen in FIG. 2. This positioning aids in mounting the weatherstrip 10 which enables rocking motion of the strip 10 during installation.

Finger 59 extends from the mounting leg 34 near the connection with radius 46. Finger 59 serves to prevent the flange 16 from entering into crevice 61 during installation of the strip onto the flange 16 as seen in FIG. 3. The finger 59 guides flange 16 between rolling lock members 56 and 57 and ribs 58 to ensure proper securement of the weatherstrip onto the flange 16.

The elastomeric cover 38 has a show surface 60 which is exposed to the viewer. Show surface 60 can be the outer surface of the elastomeric cover or alternatively a metalic film providing a metallic appearance or a colored polymeric layer, which may be layered directly onto core 36 or over the elastomeric cover 38, may be added to provide an aesthetically pleasing appearance.

FIGS. 4 and 5 illustrate additional embodiments of the present invention. Those elements which are the same as those previously described will be designated with same reference numerals.

FIG. 4 illustrates another embodiment of the reinforcement member 36 in accordance with the present invention. The reinforcement member 36 in cross-section, includes a tail portion 40, a shoulder portion 38, the hook portion 44, radius portions 46 and 48, and reentrant bent mounting leg 134. The reentrant bent mounting leg 134 is comprised of a plurality of fingers 136 extending from radius portion 46. The fingers 136 are separated by a slot or gap 138. The fingers 136 provide a resiliant spring action in the mounting leg 134 to secure onto a flange 16. The dual or two stage spring would include the previously described first spring portion and the second spring portion is formed from the narrowed radius portion 46 and the mounting leg 134. The fingers 136 enable the mounting leg 134 to adapt to discontinuities and irregular contour of the flange. The reinforcement member illustrated in FIG. 4 may be equally substituted for the reinforcement member previously described.

FIG. 5 illustrates another embodiment of the present invention. The weatherstripping 210 illustrates a flange mounted weatherstripping including a reinforcement member 214 having, in cross-section, a U-shape with a reentrant bent mounting leg 216 extending from a free end of the U inwardly into the channel defined by the U-shaped reinforcement member 214. The reinforcement U-shaped member 214 is covered with an elastomeric covering 220 like that described herein. A sealing member 222 extends from one of the legs of the U-shaped reinforcement 214 member to seal a door or the like.

A radius portion or web 215 having a thickness less than the thickness of the U-shaped, reinforcement member 214, like that previously described, is at the free end of the U between the mounting leg 216 and U-shaped reinforcement member 214. The rolling members 256 and 257 and ribs 258 and finger 259 are like those previously described.

The seal member 222 includes a pair of bulbous members 240 and 242 to provide the door seal. Thus, the weatherstripping of the present invention may be provided on a door opening, truck opening, engine compartment opening or the like for sealing one body member with another.

While the above description constitutes a preferred embodiment of the present invention, it is to be appreciated that the invention is susceptible to modification, variation and change without departing from the proper scope and fair meaning of the accompanying claims.

What is claimed is:

1. A generally channel-shaped strip structure for clamping retention on an edge flange, said strip structure comprising:
   a reinforcement core member having in cross-section, a channel shape defined by a first and a second leg of said core member joined by a web;
   said first leg being joined to a reentrant free end of said core member extending inwardly into said channel by a radius portion of said core member having reduced thickness relative to said free end and said first leg adjacent thereto; and
   an elastomeric cover layer bonded to said reinforcement core member, said elastomeric cover layer including means for retaining the strip structure onto an associated edge flange, said retaining means positioned on said member extending inwardly from at least one of said legs of said reinforcement core member.

2. A strip structure as in claim 1 wherein said first leg, web and second leg provide a first spring portion and said reentrant free end, radius portion and first leg provide a second spring portion, said first spring portion requiring larger force for deflection than said second spring portion.

3. A strip structure as in claim 2 wherein said retaining means of said elastomeric cover comprises at least one rolling lock member and at least one rib.

4. A strip structure as in claim 3 wherein said ribs are in opposite to spaces between said rolling lock members.

5. A strip structure as in claim 2 wherein said second leg has a circular tail portion.

6. A strip structure as in claim 5 wherein said second leg has a shoulder portion intermediate said web and said circular tail portion, said shoulder portion being adapted to engage an associated flange shoulder.

7. A strip structure as in claim 6 wherein said elastomeric cover has, in cross-section, a finger proximate to said radius and extending toward said second leg, said finger providing means for guiding a flange between said rolling lock member and said rib.

8. A weatherstripping comprising:
   a reinforcement core member having, in cross-section an overall channel shape;

a leg on said channel-shaped reinforcement core member including a first and second spring portion, said second spring portion requiring a deflection force less than a deflection force required to deflect the first spring portion, wherein said second spring portion comprises a reduction in thickness of said reinforcement core member; and an elastomeric cover layer bonded to said reinforcement core member, said elastomeric cover layer including means for retaining the weatherstrip structure onto an edge flange, said retaining means being coupled with said reinforcement core member second spring portion.

9. A weatherstripping as in claim 8 wherein said retaining means comprises at least one rolling lock member and at least one rib.

10. A weatherstripping as in claim 9 wherein said reinforcement core member has a second leg having a shoulder portion adapted to engage an associated shoulder on a flange when said weatherstripping is mounted thereon.

11. A weatherstripping as in claim 10 wherein said elastomeric cover layer has in cross-section, a finger extending inwardly into said channel proximate to said second spring portion requiring less deflection force and adapted to guide a flange between said rolling lock member and said rib.

* * * * *

UNITED STATES PATENT AND TRADEMARK OFFICE
CERTIFICATE OF CORRECTION

PATENT NO. : 5,018,308
DATED : May 28, 1991
INVENTOR(S) : Robert A. Vaughan It is certified that error appears in the above-identified patent and that said Letters Patent is hereby corrected as shown below:

Column 1, line 9, "vehicles" should be --vehicles.--

Column 2, line 4, after "FIG. 5" insert --is--

Column 2, line 18, "weatherstrips" should be --weatherstrip--

Column 2, line 28, "weatherstrips" should be --weatherstrip--

Column 3, line 8, "include" should be --includes--

Column 3, line 34, "metalic" should be --metallic--

Column 3, line 52, "resiliant" should be --resilient--

Column 4, line 4, "214 member" should be --member 214--

Column 4, line 53, claim 4, "opposite" should be --opposition--

Signed and Sealed this

Sixteenth Day of February, 1993

*Attest:*

STEPHEN G. KUNIN

*Attesting Officer*  *Acting Commissioner of Patents and Trademarks*